Oct. 31, 1967 R. E. WELBORN 3,349,930
DISTRIBUTOR
Filed Jan. 24, 1966 3 Sheets-Sheet 1

INVENTOR.
ROBERT E. WELBORN
BY
Braddock & Burd
ATTORNEYS

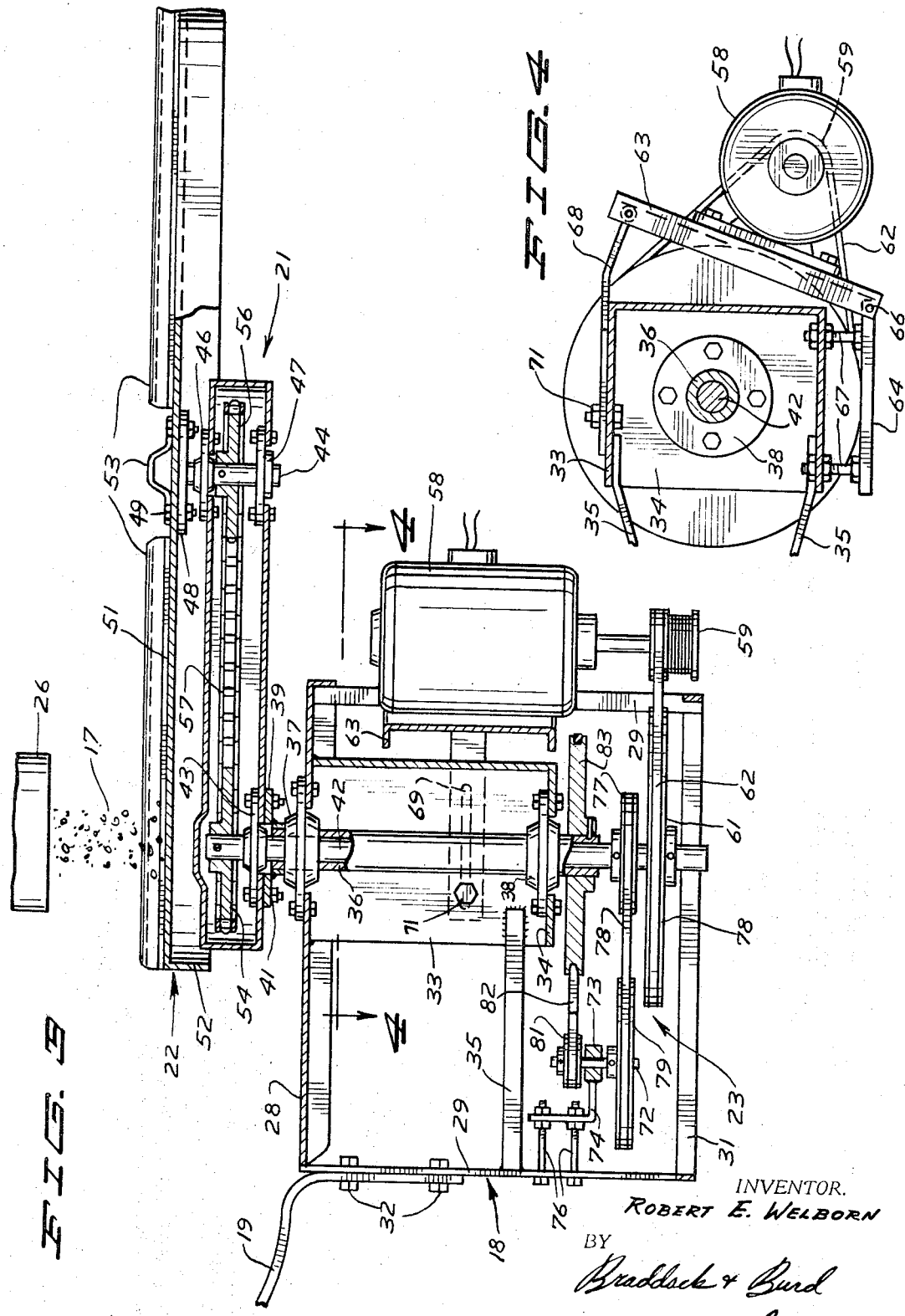

Oct. 31, 1967

R. E. WELBORN 3,349,930

DISTRIBUTOR

Filed Jan. 24, 1966

INVENTOR.
ROBERT E. WELBORN
BY
Braddock & Burd
ATTORNEYS

United States Patent Office 3,349,930
Patented Oct. 31, 1967

3,349,930
DISTRIBUTOR
Robert E. Welborn, 1424 Canal Road,
Lafayette, Ind. 47904
Filed Jan. 24, 1966, Ser. No. 522,567
10 Claims. (Cl. 214—17)

ABSTRACT OF THE DISCLOSURE

A particulate material distributor supported under the roof of a storage bin. The distributor has a frame rotatably carrying a first upright shaft telescoped in a second upright shaft. A horizontal crank arm is secured to the upper end of the second shaft and a horizontal spinner disc is rotated on the outer end of the crank arm. A chain and sprocket drive connects the first shaft with the spinner disc. Mounted on the frame is a drive mechanism including an electric motor and belts and pulleys connecting the motor to the first shaft and second shaft and arranged to drive the first shaft slower than the second shaft whereby the crank arm and spinner disc concurrently rotate. The spinner disc rotates about its axis and orbits about the axis of the first shaft. The particulate material is delivered to the top of the spinner disc by a conveyor which may be the conveyor of an auger silo unloader.

---

This invention relates to an apparatus for spreading and evenly apportioning particulate material in a storage area. More particularly, the invention relates to a machine for evenly scattering particulate agricultural materials, as grain, silage, haylage and the like in a tower storage structure during the discharge of the material into the structure.

The distributor of the present invention is adapted to be mounted under the discharge end of a conveyor used to move particulate material into a storage bin. The material discharged into the bin is collected by a funnel-shaped member and directed thereby onto a horizontal spinner disc rotatably driven about a first upright axis. The spinner disc also revolves in an orbital path about an axis spaced from and extended substantially parallel to the axis of rotation of the disc. This concurrent movement of the spinner disc evenly distributes particulate material discharged from the funnel over the entire storage area of the bin. A power drive mechanism is used to rotate the disc as well as revolve the disc in an orbital path at a speed substantially slower than the speed of rotation of the disc.

The distributor of this invention is sturdy in construction making it reliable and effective in use to distribute a wide range of particulate material, as grain, silage, haylage, as well as granular minerals and the like.

In the drawings:

FIGURE 3 is an enlarged sectional view taken along the line 3—3 of FIGURE 2;

FIGURE 4 is a sectional view taken along the line 4—4 of FIGURE 3;

Figure 1:
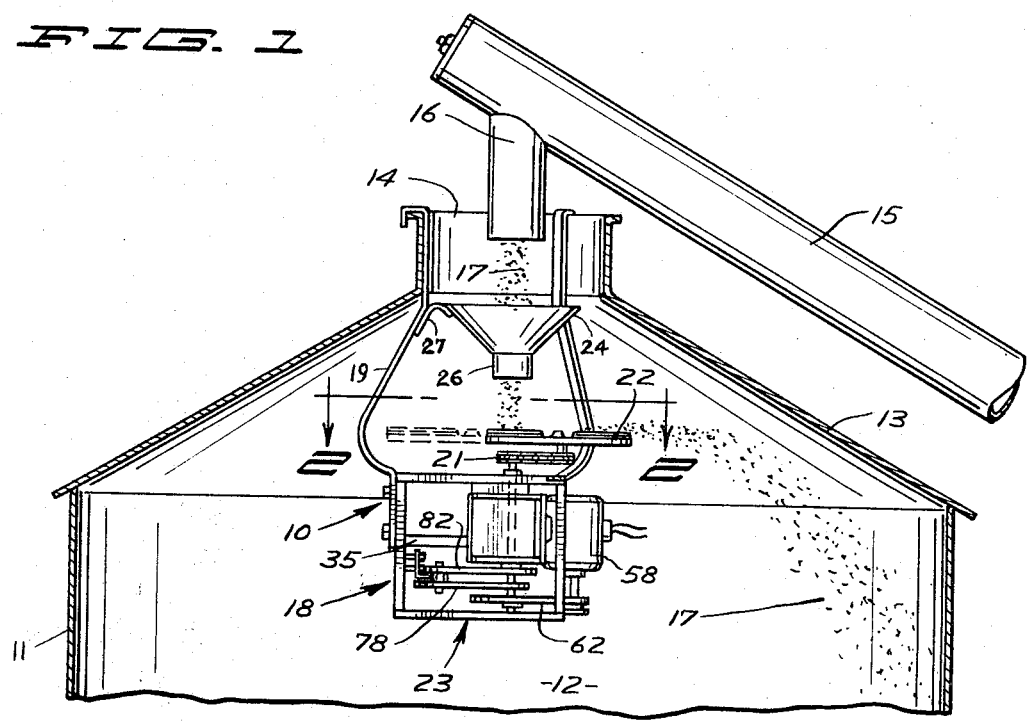
FIGURE 1 is an elevational view of the distributor of this invention mounted within a storage bin.

Referring to the drawing there is shown in FIGURE 1, the distributor of this invention indicated generally at 10 supported in a storage structure 11, as a grain bin or ensilage tower silo above a storage area 12. The distributor is supported from cone-shaped roof 13 of the bin under a center opening 14. A conveyor 15 having a downwardly projected spout 16 located in alignment with the central opening 14 is used to elevate particulate material 17, such as grain, ensilage, cut grasses, haylage and the like, to spout 16 for discharge into center opening whereby the material falls into storage area 12. Without the use of an apparatus, such as distributor 10, to spread the falling material it will form an inverted cone-shaped pile in the center of the storage area. The distributor 10 located below opening 14 functions to evenly apportion the particulate material over the entire storage area 12 as it falls into the bin whereby the material is of uniform thickness in the storage area.

Distributor 10 comprises a frame 18 supported by three upright arms 19 from the roof 13. An upright crank arm 21 rotatably mounted on the frame carries a horizontal slinger or spinner disc 22. A drive mechanism 23 coupled to the crank arm and spinner disc functions to rotate the spinner disc concurrently revolving the crank arm 21 moving the rotating disc 22 in an orbital path.

The particulate material 17 as it falls from discharge spout 16 is collected in a funnel-shaped member 24 having a downwardly open spout 26 located in substantial axial alignment with the axis of rotation of the crank arm. Brackets 27 mount the funnel member 24 on the arms 19 above the disc 22.

Referring to FIGURE 3, frame 18 has a triangular shaped horizontal top plate 28. Downwardly projected legs 29 are secured to each corner of triangular plate 21. The lower ends of legs 29 are reinforced with a peripheral bar 31 secured to each leg. Nut and bolt assemblies 32 secure the arms 19 to the sides of legs 29. A box-shaped housing 33 having a horizontal bottom wall 34 is secured to the bottom side of top plate 28 and projects downwardly therefrom. An upright tubular shaft 36 is rotatably mounted on a bearing 37 secured to the top of plate 28. A bearing 38 mounted on bottom wall 34 rotatably carries the bottom end of shaft 36. The top end of tubular shaft 36 is secured to a horizontal plate 39. Nut and bolt assemblies 41 attach the inner end of crank arm 21 to plate 39. Crank arm 21 is a rectangular box-like structure and rotates with shaft 36. Telescoped within the tubular shaft 36 is a shaft 42 carried by a bearing 43 also mounted on the inner end of crank arm 21.

A shaft 44 projects upwardly through bearings 46 and 47 secured to the outer end of arm 21. The upper end of shaft 44 is secured to a horizontal plate 48. Nut and bolt assemblies 49 secure plate 48 to the center section of circular disc 51 having a downwardly projected peripheral flange 52. Secured to the top of disc 51 are four circumferentially spaced radial vanes or ribs 53 which function to limit circumferential movement of the particulate material relative to the disc 51 thereby aid in the scattering of the particulate material on rotation of the slinger disc 22. Disc 51, flange 52 and ribs 53 comprise a one-piece unit described herein as slinger disc 22.

Shaft 42 is drivably connected to shaft 44 with a first sprocket 54 secured to the top of shaft 42 and a second sprocket 56 located within arm 21 and mounted on shaft 44 between bearings 46 and 47. Power is transmitted from sprocket 54 to sprocket 56 by a roller link chain 57 trained about the sprockets.

Drive mechanism 23 operates to rotate tubular shaft 36 concurrently with rotation of shaft 42. Shaft 42 rotates at a faster rate of speed than tubular shaft 36 whereby spinner disc 22 rotates about shaft 44 faster than arm 22 rotates about shaft 42. Drive mechanism 23 comprises an electric motor 58 having a variable speed pulley 59. A large pulley 61 is mounted on the lower end of shaft 42 in alignment with pulley 59. A V-belt 62 trained about pulleys 59 and 61 drivably connects the motor to shaft 42.

As shown in FIGURE 4, motor 58 is mounted on an upright channel member 63 pivotally mounted on a support plate 64 by an upright pin 66. Nut and bolt assemblies 67 mount plate 64 adjacent the side of housing 33. Motor 58 secured to the outside of channel member 63 is angularly moved to change the drive ratio between variable speed pulley 59 and large pulley 62. The angular location of motor 58 is held in adjusted position by a strap 68 secured to the outer end of channel member 63 and adjustably connected to housing 33. Strap 68 has a longitudinal slot 69, shown in FIGURE 3, accommodating a bolt and nut assembly 71 used to secure strap to the side of housing 33.

As shown in FIGURE 3, shaft 42 is drivably coupled to tubular shaft 36 through an upright jack shaft 72 rotatably mounted in a bearing block 73. An L-shaped bracket 74 is attached by bolt and nut assemblies 76 to leg 29.

Concurrently with rotation of slinger disc 22 the crank arm moves in a circular path about the axis of tubular shaft 36. The power is supplied to tubular shaft 36 through belts 78 and 82 which drivably connect pulley 77 mounted on shaft 42 and pulley 78 mounted on jack shaft 72. Belt 82 is trained about pulleys 81 and 83 drivably connecting jack shaft 72 with the tubular shafts 36. This pulley and belt drive reduces the speed of tubular shaft 36 below the speed of rotation of shaft 42 whereby the crank arm moves at a slower rate of speed than the speed of rotation of slinger disc 22. The angularly moving crank 23 carries slinger disc in an orbital path, indicated as circular by arrows 86 in FIGURE 3. Slinger disc 22 and crank arm 23 move in the same angular direction as indicated by arrows 84 and 86. Since a portion of the disc is always aligned with the axis of rotation of shaft 42 particulate material 17 discharged by the funnel spout 26 will fall onto the rotating spinner disc. The particulate material will be spread in a uniform sheet which moves around the bin to place a uniform layer of material on the material already stored in the bin, thus avoiding unequal distribution of stored material.

A pulley 77 is mounted on shaft 42 above pulley 62 in alignment with a large pulley 79 secured to the lower end of jack shaft 72. A V-belt 78 drivably connects pulleys 77 and 79. A small pulley 81 is secured to the top end of jack shaft 72 projected through bearing block 73. Belt 82 trained about pulley 81 drivably connects pulley 81 with a large pulley 83 secured to the lower end of tubular shaft 36. The nuts on the assemblies 76 are adjustable to place the proper tension on belts 78 and 82.

Figure 2:
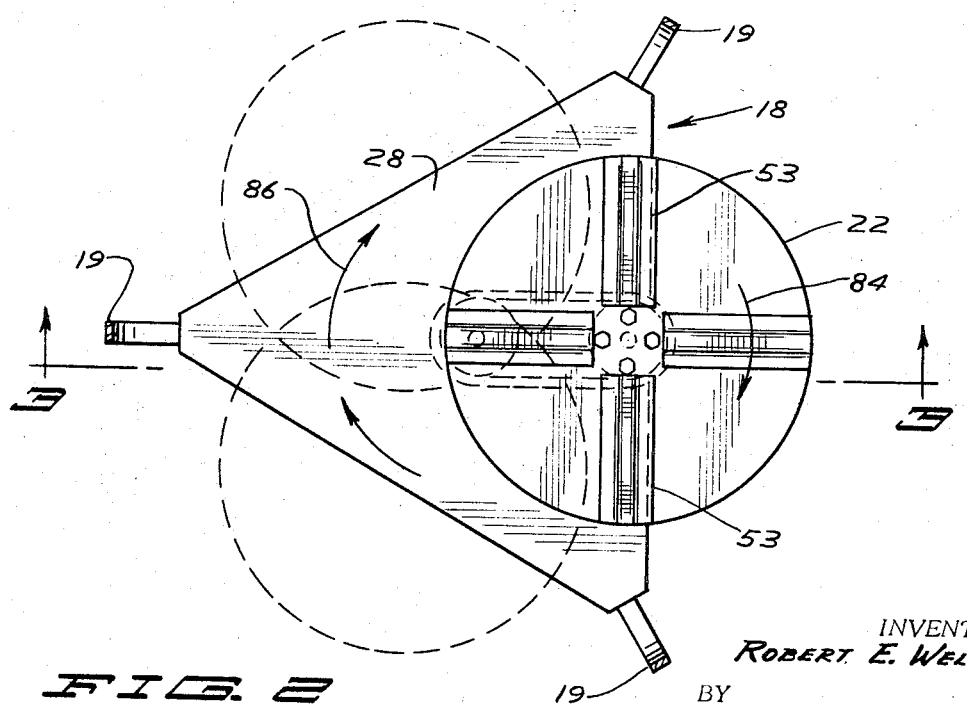
FIGURE 2 is an enlarged sectional view taken along the line 2—2 of FIGURE 1.

In use, as shown in FIGURE 1, distributor 10 is attached to bin roof 13 immediately below the center opening 14 positioning the funnel shaped member 24 below the conveyor discharge spout 16 so that particulate material 17 is collected by the funnel shaped member and directed downwardly onto the spinner disc 22 within the area of the axis of rotation of crank arm 21. When motor 58 is connected to a source of electric power, shaft 42 will be driven through larger pulley 61 connected by belt 62 to motor pulley 59. Shaft 42 drives sprocket 54 which in turn rotates sprocket 46 through the endless link chain 57. Sprocket 56 rotates shaft 44 which in turn rotates slinger disc 22 in the direction of the arrow 84 as shown in FIGURE 2. The particulate material 17 falling on disc 22 is carried and accelerated in a circumferential direction by the rotating disc. As the material leaves disc 22 it is evenly spread in a radially uniform pattern out into the storage area of the bin.

In terms of a method of distributing material in a storage area the invention includes the steps of initially transporting the material to a position above the center of the storage area. As this material falls downwardly into the storage area it is collected by funnel member 24 which directs the material downwardly along the upright axis of tubular shaft 36. This axis is the axis of rotation of crank arm 21. As the material falls from funnel member 24 it is propelled in a lateral direction as a substantially uniform sheet of material. This sheet pattern is caused by the power driven spinner disc 22 which accelerates the material tangentially of the disc. The rotating spinner disc 22 receives the material adjacent its outer peripheral edge and with the help of vanes 53 spreads and propels the material from the center of the storage area to the outer perimeter of the storage area. The major portion of the sheet of material is moved around the upright axis of crank arm 21 in an orbital path to deposit a generally uniform layer of material on top of the material in the storage area. This movement of spinner disc 24 in an orbital path is simultaneous with rotation of spinner disc 22.

Figure 5:
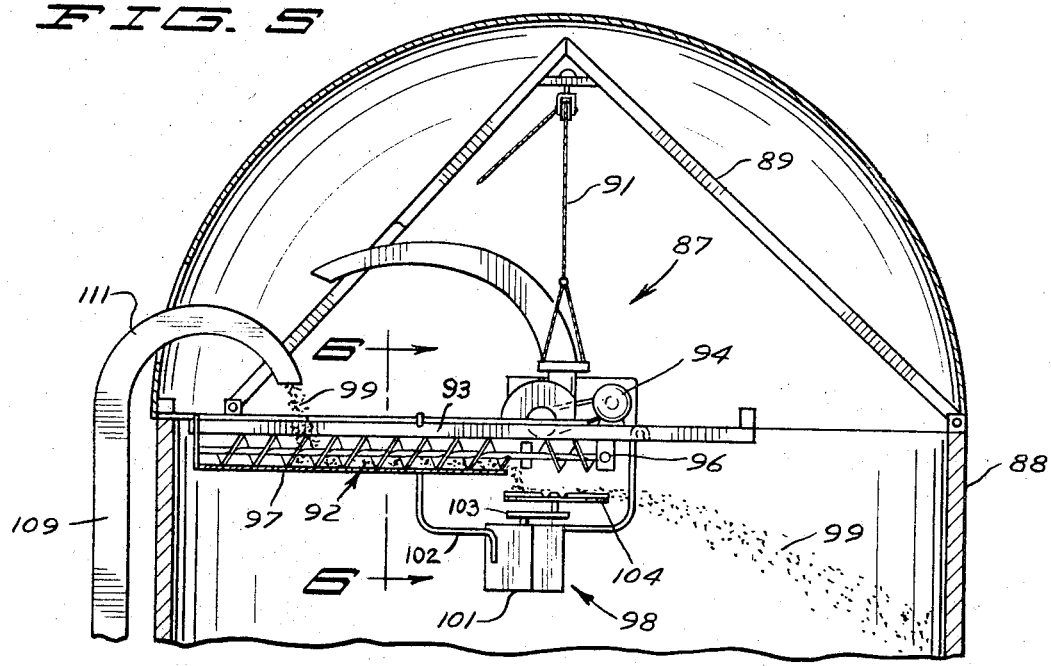
FIGURE 5 is an elevational view of the distributor of this invention mounted under a silo unloader for spreading ensilage delivered to the silo unloader and carried to the distributor by the silo unloader; and, FIGURE 6 is an enlarged sectional view taken along the line 6—6 of FIGURE 5 showing the location of the augers of the silo unloader relative to the distributor.
Figure 6:
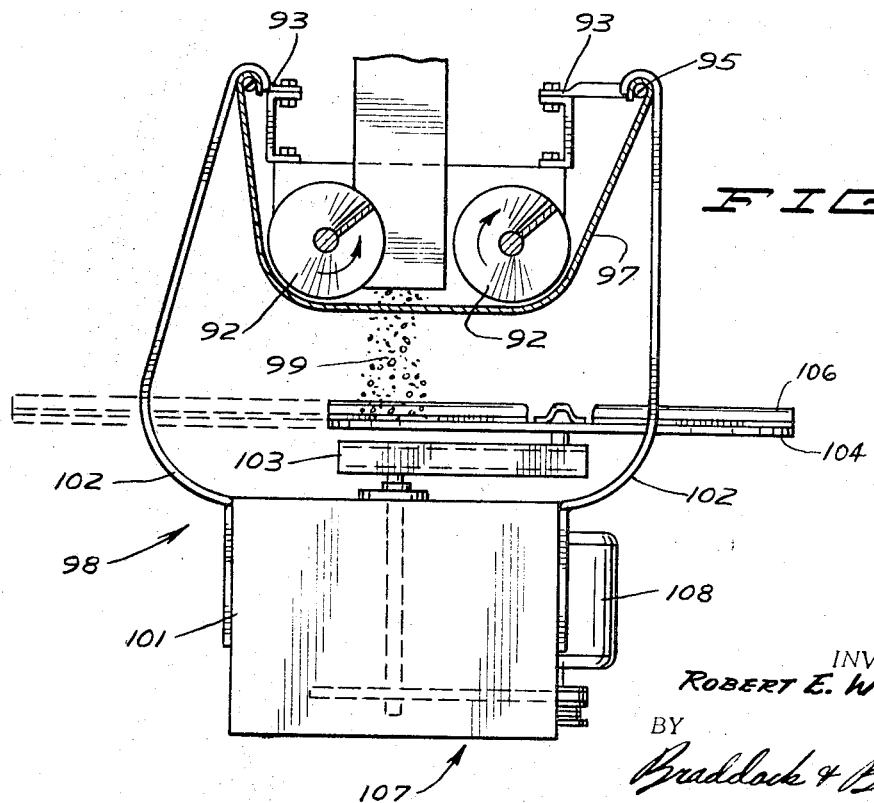

Referring to FIGURES 5 and 6, there is shown a top unloading silo unloader, as the silo unloaders shown in U.S. Patent Nos. 2,801,137 and 3,223,256, positioned at the top of a tower silo 88. Silo unloader 87 is pendently supported from a tripod 89 by a cable 91. Prior to the filling of the silo 88 the unloader 87 is raised to the top of the silo to eliminate the necessity to assemble the silo unloader after the silo has been filled. Silo unloaders of this type have elongated collector arms having an auger assembly 92 rotatably mounted on frame members 93. The auger assembly 92 is rotated by a motor 94 connected to a transmission 96 which in turn drives the auger assembly to convey ensilage toward the center of the silo.

Silo unloader 87 is equipped with a removable trough-like sheet member 97 located under the auger assembly 92 and hooked on the frame members 93 and to forward bumper or guard 95 as shown in FIGURE 6. The trough-like member 97 extends from the outer end of the auger assembly terminating inwardly adjacent the inner end of the auger assembly and thereby forms with the auger assembly an elongated conveyor for moving material radially inwardly to the center area of the silo.

Mounted below the center of the silo unloader 87 is a distributor indicated generally at 98 which is identical with the distributor 10 as shown in FIGURE 1. The ensilage 99 is moved by the auger assembly 92 onto the distributor which functions to scatter and evenly apportion ensilage over the top area of the silo. The distributor 98 has a frame 101 secured to upwardly projected arms 102. The upper ends of the arms 102 are attached to frame 93 of the silo unloader positioning the distributor 98 below discharge end of the trough-like member 97. A horizontal crank arm 103 is rotatably mounted on the frame. A horizontal spinner disc 104 is rotatably mounted on the outer end of crank arm 103 in a manner similar to the spinner disc 22 and crank arm 21 as shown in FIGURE 3. A plurality of radial vanes 106 secured to the top of spinner disc 104 aid in the propulsion of material radially into the silo. Crank arm 103 and spinner disc 104 are rotated about separate upright axes by a drive mechanism 107 having a motor 108. Drive mechanism 107 is identical to drive mechanism 23 shown in FIGURE 3. On energization of the motor 108 the drive mechanism 107 rotates the spinner disc 104 concurrently with revolving the crank arm in an orbital path thereby spreading the ensilage 99 in an even radial pattern which moves around the top of the silo. Spinner disc 104 rotates faster than and in the same direction as crank arm 103.

Ensilage 99 is delivered to the top area of the silo by a conventional conveyor such as a blower (not shown) having an upright blower pipe 109 terminating in an inwardly curved horn or discharge spout 111 which directs ensilage into the silo. The auger assembly 92 or collector arm of the silo unloader is positioned in alignment with the discharge end of horn 111 such that the ensilage 99 is directed into the auger assembly 92 and retained therein by the trough-like member 97. Fastening means, as a hook (not shown), is used to hold the silo unloader conveyor arm in alignment with horn 111. Operation of the silo unloader motor 94 rotates auger assembly 92 and thereby moves the ensilage toward the center area of the silo. The silage moved by the auger assembly 92 falls as a continuous stream onto the rotating spinner disc 104 in the area of the axis of rotation of the crank arm 103 as shown in FIGURE 6. Thus, the spinner disc 106 is continuously supplied with ensilage in approximately the same location as it revolves about the axis of rotation of crank arm 103. The rotating spinner disc 104 accelerates the ensilage laterally spreading it radially out into the silo in an even pattern. This pattern revolves around the silo with the movement of crank arm 103 and thereby distributes the ensilage 99 in an even layer on top of the silo.

The specific embodiments and methods of distributing material described are given by way of example. Modifications, changes in materials and omission of parts may be made by a person skilled in the art without departing from the invention. The invention is to be limited only by the terms and scope of the appended claims.

The embodiments of the invention in which an exclusive property or privilege is claimed are defined as follows:

1. An apparatus for distributing particulate material discharged into a storage area comprising a frame, a first upright tubular shaft rotatably mounted on said frame, said shaft having an upper end projected above said frame, an elongated crank arm projected generally radially of said first shaft, means securing the inner end of the crank arm to the upper end of said first shaft, a distributor disc located over the crank arm, means rotatably mounting the distributor disc on the outer end of the crank arm for rotation about an axis generally parallel to the axis of the first upright shaft, a second upright shaft located within said first tubular upright shaft having opposite ends projected through said first tubular shaft, power transmitting means connecting the upper end of the second shaft to the means for rotatably mounting the disc on the outer end of the crank arm, a motor mounted on said frame, and second power transmitting means connecting the motor to the first shaft and the second shaft whereby on operation of the motor the first shaft and the second shaft rotate together to concurrently angularly move the crank arm and rotate the distribuor disc.

2. The apparatus of claim 1 wherein said second power transmitting means rotates said crank arm and distributor disc in the same angular direction and rotates the first tubular shaft at a slower rate of speed than the speed of rotation of the second shaft.

3. The apparatus of claim 1 further characterized with means positioned above the distributor disc for directing particulate material onto the disc generally along the axis of said upright shaft.

4. The apparatus of claim 1 wherein conveyor means delivers particulate material to said distributor disc, said conveyor means comprises an auger assembly of a silo unloader for moving material toward the center area of a silo and trough-like means positioned under said auger assembly; and means for supporting the apparatus for distributing particulate material under the center of the silo unloader whereby material moved by the auger assembly is discharged onto the apparatus and evenly scattered over the top area of the silo.

5. The apparatus of claim 1 further characterized wherein the second power transmitting means drives the tubular shaft slower than the second shaft.

6. The apparatus of claim 1 wherein said second power transmitting means rotates said tubular shaft and rotates said distributor disc in the same angular direction.

7. An apparatus for distributing particulate material discharged into a storage area comprising: a frame, a distributor disc located above said frame, means rotatably mounting the distributor disc for rotation about a first upright axis in a generally horizontal plane above the frame, an elongated crank arm projected generally radial of said first upright axis, said arm located below and extended generally parallel to said distributor disc, means mounting said crank arm for rotation about a second upright axis spaced from and generally parallel to said first axis, a motor mounted on said frame, first power transmitting means drivably connecting the motor with the distributor disc and second power transmitting means drivably connecting the first power transmitting means with the crank arm whereby upon rotation of the distributor disc, by operation of the motor, the crank arm angularly moves about said second upright axis concurrently with rotation of the distributor disc about the first upright axis.

8. The apparatus of claim 7 wherein said first power transmitting means comprises an upright shaft, drive means coupling the motor and the shaft and means connecting the shaft to the distributor disc.

9. The apparatus of claim 7 wherein said second power transmitting means comprises an upright shaft, drive means connecting the shaft and the first power transmitting means, and means connecting the shaft to the crank arm.

10. The apparatus of claim 7 wherein said first power transmitting means comprises a first upright shaft, first drive means coupling the motor to the first shaft and means drivably connecting the first shaft to the distributor disc, said second power transmitting means comprises a second upright shaft, second drive means connecting the second shaft with the first shaft and means connecting the second shaft to the crank arm.

References Cited

UNITED STATES PATENTS

| 3,075,657 | 1/1963 | Hazen | 214—17 |
| 3,206,044 | 9/1965 | Schwichtenberg | 214—17 |
| 3,209,925 | 10/1965 | Coenen | 214—17 |
| 3,232,458 | 2/1966 | Freeman | 214—17 |
| 3,262,586 | 7/1966 | Smiley | 214—17 |

HUGO O. SCHULZ, *Primary Examiner.*

ROBERT G. SHERIDAN, *Examiner.*